United States Patent [19]

Most et al.

[11] Patent Number: 4,987,599
[45] Date of Patent: Jan. 22, 1991

[54] COMMUNICATION CONTROL CONSOLE CENTER WITH IMPROVED VOLUME CONTROL

[75] Inventors: Steven B. Most, Elmhurst; Hillel A. Meyers, Chicago; Susanne L. Dunsmore, Evanston; Jeffrey J. Blanchette, Hoffman Estates, all of Ill.

[73] Assignee: Motorola, Inc., Schaumburg, Ill.

[21] Appl. No.: 330,244

[22] Filed: Mar. 29, 1989

[51] Int. Cl.⁵ .............................................. H03G 3/00
[52] U.S. Cl. ..................................... 381/107; 381/109
[58] Field of Search .................. 381/107, 109; 455/232

[56] References Cited

U.S. PATENT DOCUMENTS 4,363,001 12/1982 Suzuki et al. ...................... 381/107
4,550,400 10/1985 Henderson, Jr. et al. .......... 381/107
4,792,990 12/1988 Beyers, Jr. ........................... 381/107

OTHER PUBLICATIONS

Motorola, Inc., System Planner, R4-2-37C, Mar. 1988.

Primary Examiner—Forester W. Isen
Attorney, Agent, or Firm—Timothy W. Markison; Steven G. Parmelee; Joseph P. Krause

[57] ABSTRACT

An improved communication control console center wherein the volume level for a selected communication resource will be set to a predetermined initial volume level, which level may be changed thereafter by appropriate adjustment of a multi-level switch.

8 Claims, 2 Drawing Sheets

COMMUNICATION CONTROL CONSOLE CENTER WITH IMPROVED VOLUME CONTROL

TECHNICAL FIELD

This invention relates generally to control consoles, and particularly to an improved volume control device and method for use therewith.

BACKGROUND ART

Control console centers are commonly employed to control several transceivers from a common location. Generally, the control console enables an operator to monitor or communicate over various communication channels to provide supervisory or dispatcher functions. Such control console centers typically provide the operator with at least two speakers for transducing audible information. Generally, one speaker is used for monitoring a selected communication resource (selected speaker), and the other speaker is used for monitoring a mix of nonselected communication resources (mix speaker).

To control the volume of the selected speaker, or the mix speaker, the prior art typically provides two selection switches and an adjustment switch (usually a potentiometer). The first selection switch causes the audio information of the selected communication resource to be routed to the selected speaker. The second selection switch initiates or deactivates a full volume setting of the communication resource. Finally, if the second selection switch has deactivated the full volume setting, the adjustment switch allows the operator to manually adjust the volume setting of the communication resource.

For example, when a communication resource is first selected by enabling the appropriate channel control module (CCM), the selected speaker receives the audio information at full volume. If the operator wishes to lower the volume level of the selected resource, he must engage the second selection switch. Once the second selection switch has deactivated the full volume setting, the adjustment switch may then be utilized to obtain the desired volume level. There are certain inefficiencies associated with this approach.

For example, due to hardware requirements, this configuration typically requires the use of two channel control switch modules (CCSM). Further, and more critically, the operator is required to manipulate two switches to effectively achieve a single function; i.e., changing volume level from an initial predetermined full volume.

A need exists for a communication control console center that avoids these problems.

SUMMARY OF THE INVENTION

These needs and others are substantially met through provision of a communication control console center having an improved volume control as disclosed herein. The improved volume control invention operates in conjunction with a communication control console center that includes an audio input for receiving audio signals from any of a plurality of communication resources, such as predetermined frequencies, frequency pairs, or TDM time slots. The center also includes audio transducers for converting at least some of these audio signals into audible signals, and a communication resource control for controlling at least one communication control console center function that relates to a particular communication resource.

For example, the communication resource control includes a communication resource select mechanism to allow selection of a particularly communication resource, and a volume range select mechanism, including a multi-level switch, for controlling audible signal levels for a particular communication resource. Finally, the center will also typically include an audio level control that responds to the communication resource control and operably couples to the audio input and the audio transducer for controlling the volume level for at least some of the audible signals.

The invention itself includes revisions to the audio level control, such that the audio control responds to the communication resource select mechanism and causes an initial preselected volume level for an audio signal associated therewith to be selected when a particular communication resource is selected. The improved audio level control includes other revisions which cause an alteration of the audio volume whenever the multi-level switch is adjusted, by at least a minimum predetermined amount, and may cause the communication resource to retain its adjusted audio volume level when it is deselected.

So configured, the two selection switch structure of the prior art is avoided. Instead, a single switch, in the above embodiment the multi-level switch, provides all volume control capabilities while simultaneously insuring that when a communication resource is first selected, it will be presented at the selected speaker at an initial preselected volume.

In one embodiment, the initial preselected volume level for an initially selected communication resource constitutes a full volume signal. The audio transducers themselves may also include additional volume controls such that the master volume control may also be adjusted at a speaker itself.

In another embodiment, a display, such as appropriate LEDs, may be provided to indicate the operational status of the selection of the initial preselected volume.

BEST MODE FOR CARRYING OUT THE INVENTION

Figure 1:
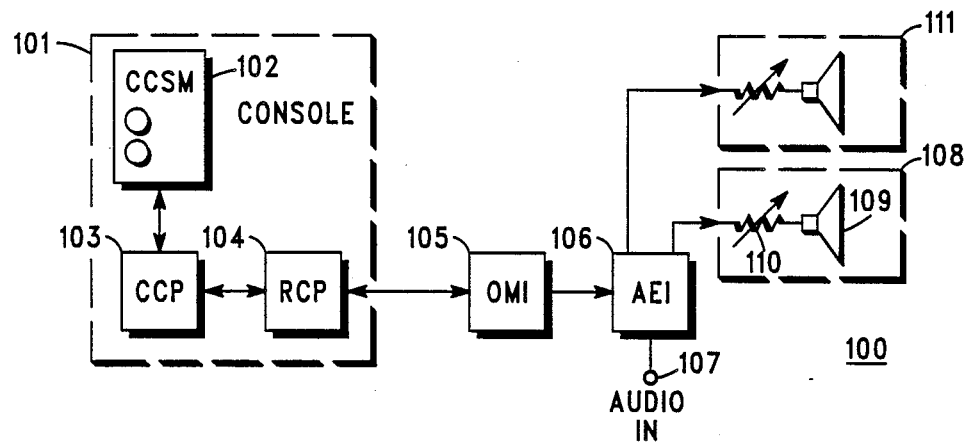
FIG. 1 comprises a block diagram depiction of the invention.

FIG. 1 illustrates a communication control console center (100) comprising a console (101), an operator's MUX interface (OMI) (105), an audio expansion interface (AEI) (106), and appropriate audio input (107), a selected transducer (108) and a mix transducer (111). The console (101) typically comprises a channel control panel (CCP) (103), a radio control panel (RCP) (104), and a plurality of channel control modules (CCM) (not shown) and each CCM comprises a plurality of channel control module switches (CCSM) (102). (Additional information regarding the CCMs and the CCSMs will be provided below.)

The center (100) operates as follows. The AEI (106) receives audio information through the appropriate audio input (107) from various sources, typically from a plurality of communication resources. The AEI (106)

then receives audio volume information from the OMI (105) which is communicated to the OMI (105) from the RCP (104) which is communicated to the OMI (105) from the RCP (104). The RCP (104) also communicates with and control a plurality of CCPs (103) and the CCPs (103) communicate with and assist in controlling a plurality of CCSMs (102).

The AEI (106) also provides a first audio output, comprising audio information of the selected communication resource, to the selected transducer (108). The selected transducer (108) typically includes at least a speaker (109) and a master volume adjustment control (110). The AEI (106) further provides a second audio output, comprising at least a portion of the unselected communication resources, to the mix transducer (111).

All of the above devices are well known and understood in the art, and hence no further descriptive material will be set forth.

Figure 2:
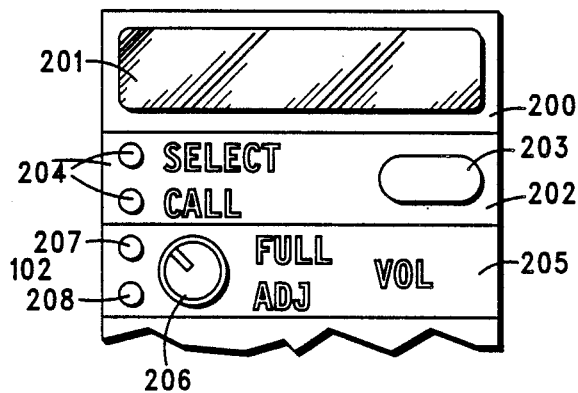
FIG. 2 comprises an enlarged detailed view of a channel control switch module.

Referring to FIG. 2, a portion of a CCM (200) can be seen to include a display (201), as well understood in the art, and at least two CCSMs (102). Pursuant to this invention, one of the CCSMs (202) includes a selection switch (203). This switch (203) allows the operator to select a particularly communication resource. Once selected, the console functions in a known manner to allow the operator to readily communicate on that communication resource. In particular, the incoming audio information on that communication resource is directed to the selected transducer (108). Display indicators, in this case LEDs (204), are provided to indicate the operational status of the selection switch (203).

The remaining depicted CCSM (205) includes a multi-level switch (206). In this particular embodiment, the multi-level switch (206) comprises a potentiometer. In the appropriate embodiment a digital switch or other multi-level switch could be utilized. Also provided are two volume mode indicators, again provided through use of LEDs (207 & 208). The first LED (207) is switched on when the audio is at an initial preselected volume level, in this embodiment full volume. The remaining indicator (208) is illuminated when the volume is not at the initial preselected volume level.

Figure 3:
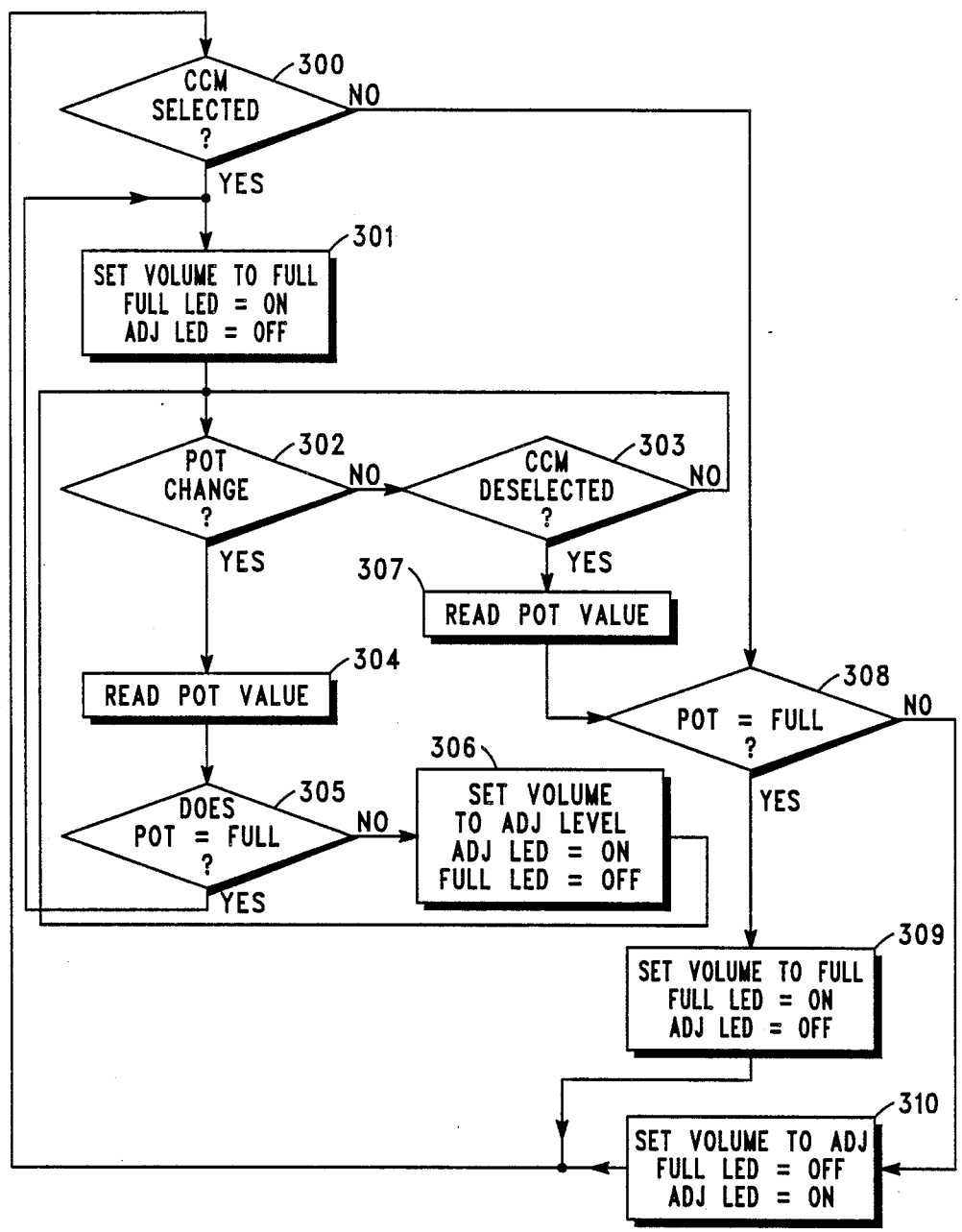
FIG. 3 comprises a flow diagram depicting operation of the invention.

Referring now to FIG. 3, the OMI (105) includes appropriate processing capabilities, which pursuant to this invention are modified as follows. The OMI (105) is modified to continually monitor each CCM (200), via the appropriate control and communication paths noted above, to determine if a CCM (200) has been selected (300). If a CCM (200) has been selected, the OMI (105) sets the volume of the associated communication resource to full volume, switches the full volume indicator (207) on, and switches the adjustable volume indicator (208) off (301). Next, the OMI (105) monitors the multi-level switch (206) to determine if an adjusted has been made (302). If no adjustments are detected, the OMI (105) checks if the CCM (200) has been deselected (303). If the CCM (200) has not been deselected, the OMI (105) waits for either a volume adjustment of a CCM (200) deselection. Note that the OMI (105) may be engaged in any or all of its other multi-task functions while in this or any other volume adjustment processing mode. The function of the OMI (105) when the CCM (200) is deselected is discussed below.

If the OMI (105) detects a multi-level switch adjustment (302), it reads the adjustment value (304), then tests for a full volume setting (305). If the multi-level switch setting is at full volume, the OMI (105) functions as described above (301). If the multi-level switch setting is not at full volume, the OMI (105) sets the volume of the associated communication resource to the adjusted level, switched the full volume indicator (207) off, and switches the adjust volume indicator (208) on (306). The OMI (105) repeats the above process (301 to 306) until the CCM (200) is deselected.

Once the CCM (200) is deselected (303), the OMI (105) reads the multi-level switch setting (307) and then tests for a full volume setting (308). If the multi-level switch setting it at full volume, the OMI (105) sets the volume of the associated communication resource to full volume, switches the full volume indicator (207) on, and switches the adjust volume indicator (208) off (309). If the multi-level switch setting is not at full volume, the OMI (105) sets the volume to the adjusted level, switches the full volume indicator (207) off, and switches the adjust volume indicator (208) on (310). After either of these functions, the OMI (105) awaits a CCM selection (300) and then repeats the entire process.

What is claimed is:

1. In a communication control console center that includes:
  (a) audio input means for receiving audio signals from a plurality of communication resources to produce received audio signals;
  (b) a console, operably associated with the audio input means, that includes:
    1. selection means for selecting one of the plurality of communication resources to produce a selected communication resource and a plurality of non-selected communication resources; and
    2. volume adjustment means for adjusting volume levels of at least some of the received audio signals from the selected communication resource when the volume adjustment means is activated;
  (c) selected transducer means, operably associated with the console and the audio input means, for converting the received audio signals from the selected communication resource into audible signals;
  (d) mix transducer means, operably associated with the console and the audio input means, for converting the received audio signals from at least some of the non-selected communication resources into audible signals;
  (e) audio expansion means, operably associated with the audio input means, selected transducer means, the mix transducer means, and the console, for providing the received audio signals from the selected communication resource to the selected transducer means and for providing the received audio signals from the at least some of the non-selected communication resources to the mix transducer means; and
  (f) an operator mux interface that is operably coupled to the audio expansion means and the console;
  where the operator mux interface is improved to comprise:
    volume setting means, operably associated with the volume adjustment means, for setting the volume level of the received audio signals from the selected communication resource at an initial preselected volume whenever the selected communication resource is selected independent of the volume adjustment means setting; and
    volume adjustment activating means, operably associated with the volume setting means, the selection means, and the volume adjustment means, for automatically activating the volume adjustment means while the selected communication resource is selected and when a volume adjustment is detected on the volume adjustment means.

2. The improvement of claim 1 wherein the console further comprises display means for indicating when the initial preselected volume has been selected.

3. The improvement of claim 2 wherein the display means comprises at least one LED.

4. In a communication control console center that includes:
  (a) audio input means for receiving audio signals from a plurality of communication resources to produce received audio signals;
  (b) a console, operably associated with the audio input means, that includes;
    1. selection means for selecting one of the plurality of communication resources to produce a selected communication resource and a plurality of non-selected communication resources; and
    2. volume adjustment means for adjusting volume levels of at least some of the received audio signals from the selected communication resource when the volume adjustment means is activated;
  (c) selected transducer means, operably associated with the console and the audio input means, for converting the received audio signals from the selected communication resource into audible signals;
  (d) mix transducer means, operably associated with the console and the audio input means, for converting the received audio signals from at least some of the non-selected communication resources into audible signals;
  (e) audio expansion means, operably associated with the audio input means, selected transducer means, the mix transducer means, and the console, for providing the received audio signals from the selected communication resource to the selected transducer means and for providing the received audio signals from the at least one of the non-selected communication resources to the mix transducer means; and
  (f) an operator mux interface that is operably coupled to the audio expansion means and the console;
a method for adjusting the volume levels of the received signals from the selected communication resource comprising the steps of:
  (1) setting the volume level of the received signals from the selected communication resource at an initial preselected volume whenever the selected communication resource is selected regardless of the volume adjustment means setting; and
  (2) automatically activating the volume adjustment means when a volume adjustment is detected on the volume adjustment means and while the selected communication resource is selected, such that the volume level of the received signals from the selected communication resource are adjusted to an adjusted level.

5. The improved method of claim 4 wherein the method further comprises the step of setting at least one volume mode indicator to indicate either the preselected volume setting or an adjusted volume setting.

6. The improved method of claim 4 wherein the method further comprises the step of detecting a communication resource deselection.

7. The improved method of claim 6 wherein the method further comprises the step of setting the audio volume of the communication resource of an adjusted volume whenever the communication resource deselection has been detected.

8. The improved method of claim 7 wherein the method further comprises the step of setting at least one volume mode indicator to indicate either the preselected volume setting or an adjusted volume setting.

* * * * *